US010491416B2

(12) United States Patent
Singamsetty et al.

(10) Patent No.: US 10,491,416 B2
(45) Date of Patent: Nov. 26, 2019

(54) SYSTEMS AND METHODS FOR HIGH EFFICIENCY LIGHTING INSTALLATIONS

(71) Applicants: Suresh Kumar Singamsetty, Aliso Viejo, CA (US); Dennis Ching Chung Kwan, San Diego, CA (US)

(72) Inventors: Suresh Kumar Singamsetty, Aliso Viejo, CA (US); Dennis Ching Chung Kwan, San Diego, CA (US)

(73) Assignee: WiSilica Inc., Laguna Hills, CA (US)

( * ) Notice: Subject to any disclaimer, the term of this patent is extended or adjusted under 35 U.S.C. 154(b) by 0 days.

(21) Appl. No.: 14/887,302

(22) Filed: Oct. 19, 2015

(65) Prior Publication Data

US 2019/0036722 A1  Jan. 31, 2019

Related U.S. Application Data

(60) Provisional application No. 62/087,161, filed on Dec. 3, 2014, provisional application No. 62/100,482, filed
(Continued)

(51) Int. Cl.
*H05B 37/02* (2006.01)
*H04L 12/28* (2006.01)
(Continued)

(52) U.S. Cl.
CPC ....... *H04L 12/282* (2013.01); *H05B 37/0272* (2013.01); *H04L 2012/2841* (2013.01);
(Continued)

(58) Field of Classification Search
CPC ............ H05B 33/0845; H05B 33/0872; H05B 37/0227; H05B 37/0245; H05B 37/0272
(Continued)

(56) References Cited

U.S. PATENT DOCUMENTS 9,509,402 B2 * 11/2016 Ryan .................... H04B 10/116
2011/0215732 A1 * 9/2011 Chen ..................... H05B 41/36
315/291

(Continued)

*Primary Examiner* — Tung X Le
(74) *Attorney, Agent, or Firm* — Rowan TELS LLC (57) ABSTRACT

This disclosure provides a system of intelligent lights together with control devices and sensors communicating over a wireless network, with methods to allow the lights to take actions based on logical combinations of events generated by other devices. The lights can function autonomously as they have built-in functions of logic processing, storage and wireless communications which allow them to receive events and take actions according to the stored logic configuration data. Complete freedom in the grouping of lights as well as association of control devices and sensors to each individual lights is enabled by this system architecture. Seamless communication coverage is enabled by a wireless protocol that allows the light to form a mesh network. The discovery of devices in the network and their capabilities/services, as well as the setting up of the logic configuration data for the lights, are performed by a smart phone or similarly device with user interface, which facilitates simpler hardware for the lights as well as making it easy to add new devices and discovering their capabilities/services. Additional functions of the intelligent lights are location-based services using periodic broadcast data packets transmitted from the lights, as well as receiving broadcast data packets from other devices.

5 Claims, 10 Drawing Sheets

Related U.S. Application Data on Jan. 7, 2015, provisional application No. 62/131,842, filed on Mar. 12, 2015.

(51) Int. Cl.
| | |
|---|---|
| H04W 4/02 | (2018.01) |
| H04W 4/30 | (2018.01) |
| H04W 4/80 | (2018.01) |

(52) U.S. Cl.
CPC .............. *H04W 4/023* (2013.01); *H04W 4/30* (2018.02); *H04W 4/80* (2018.02); *H05B 37/0218* (2013.01); *H05B 37/0227* (2013.01)

(58) Field of Classification Search
USPC ........................................ 315/152, 307, 312
See application file for complete search history.

(56) References Cited

U.S. PATENT DOCUMENTS

| | | | |
|---|---|---|---|
| 2015/0043425 A1* | 2/2015 | Aggarwal | H04W 4/70 370/328 |
| 2015/0048758 A1* | 2/2015 | Carrigan | H05B 33/0842 315/294 |
| 2015/0189721 A1* | 7/2015 | Karc | H05B 37/0272 315/250 |
| 2016/0029464 A1* | 1/2016 | Hughes | H05B 33/0842 315/131 |
| 2016/0047164 A1* | 2/2016 | Lundy | E06B 9/68 160/5 |

* cited by examiner

| | 1 - WORKING HOURS | 2 - AFTER HOURS | 3 - NIGHT |
|---|---|---|---|
| REAL TIME CLOCK | 8AM TO 6PM | 6PM TO 10PM | 10PM TO 8AM |
| AMBIENT LIGHT SENSOR 1 | LIGHT DEPENDENT | N/A | N/A |
| AMBIENT LIGHT SENSOR 2 | N/A | N/A | N/A |
| OCCUPANCY SENSOR 1 | ACTIVE = ON<br>INACTIVE = 30% | ACTIVE = ON<br>INACTIVE = 30% | ACTIVE = 30%<br>INACTIVE = OFF |
| OCCUPANCY SENSOR 2 | ACTIVE = 60%<br>INACTIVE = OFF | N/A | N/A |
| LOCAL TIMEOUT | 10 minutes | 2 minutes | 30 seconds |

SYSTEMS AND METHODS FOR HIGH EFFICIENCY LIGHTING INSTALLATIONS

CROSS-REFERENCE TO RELATED APPLICATIONS

This present disclosure claims the benefit of U.S. Provisional Application Ser. No. 62/087,161 Dec. 3, 2014, Ser. No. 62/100,482, filed on Jan. 7, 2015, and Ser. No. 62/131,842, filed on Mar. 12, 2015.

TECHNICAL FIELD

The present invention relates generally to the field of energy efficient lighting systems. Specifically the present invention relates to lighting systems that are connected, managed and optimized via wireless mesh networks.

BRIEF BACKGROUND

With the growing demands on the existing power grid—coupled with an ever-increasing threat of climate change—improving energy efficiently has become a forefront concern for many new and existing lighting system installations. Traditional lighting systems in residential and commercial locations are notoriously inefficient as they are often left on when they are not needed (e.g. when the building is not occupied, or when natural daylight is available) and thus waste valuable energy while causing unnecessary greenhouse emissions.

In response to these concerns progressive government states have begun mandating high efficiently lighting systems that are compliant with low energy standards. For example, the state of California has recently updated Title 24 of the California Code of Regulations to now require that all new lighting systems have an ambient light sensor and an occupant sensor. Further the rules may also require that lights to be dimmable, or in fixtures with multiple lights, to be able to only turn on each alternate light.

Currently available technology that complies with regulations such as Title 24 comprise of occupancy and ambient light sensors that are coupled to switches in lighting systems. However such sensors are often connected by wire, which means that they are fixed and thus inflexible. Even in rare instances when lighting systems are wireless they have very limited intelligence and networking capabilities built into the system. Such systems offer an insufficient the amount of control resulting in an unsatisfactory user experience and suboptimal energy saving.

Another limitation of many current intelligent building control systems is that their control logic is stored and executed on a central computer. Such a configuration is problematic because it increases the cost and complexity of lighting systems when scaling the number of connecting devices and nodes to the central computer.

Therefore, due to the weakness of current lighting solutions, there is a current and impending need for lighting systems that are low energy, offer a high degree of control, and are scalable.

SUMMARY OF THE INVENTION

The lighting system described herein the present invention implements a truly distributed architecture, in that each of the control devices, sensors, and lights has its own processing intelligence, is uniquely identifiable by its own address, and is supported by a wireless mesh networking protocol that allows secure communication between devices. Thus the lights, in the present invention, may be individually controlled based on decision logic that is either locally stored and executed or in response to events generated by specific control devices and sensors.

A particular implementation of this system is to use Bluetooth Low Energy (BLE) protocol as the wireless communication method. In this case the configuration of the decision logic can be performed via a smart phone application, with the smart phone transmitting the decision logic data to the specific light that is to be configured.

As an additional feature, each light may be equipped with dimming control built-in, such that the lighting intensity in each area of a building may be even more finely controlled to provide the optimal energy saving and best user experience.

Apart from the purpose of energy saving, the described system would meet certain regulatory requirements, such as the California Title 24 Standards for Building Energy Efficiency.

As an additional function, the lights may be used to transmit a BLE advertising packet periodically, acting as a "beacon", as well as to receive advertising packets from other devices, in order to facilitate location-based or proximity functions. In the case of advertising, it may allow other devices such as a smart phone to trigger certain actions in the proximity of the lights, as is commonly required in beacon application. In the case where the lights receive advertising packet from a smart phone for instance, it may cause the light to turn on, or just report the presence of the smart phone to some other devices.

BRIEF DESCRIPTION OF THE FIGURES

The invention is more fully appreciated in connection with the following detailed description taken in conjunction with the accompanying drawings, in which.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Intelligent Networked Lighting System

It is an objective of this disclosure to provide an intelligent lighting system whereby each light may be individually controlled by its own built-in logic and in response to events generated by other devices connected by a wireless network, to achieve more optimal energy usage or user experience. A plurality of lights may be controlled by a plurality of sensors and control devices, each having their own decision logic.

Figure 1:
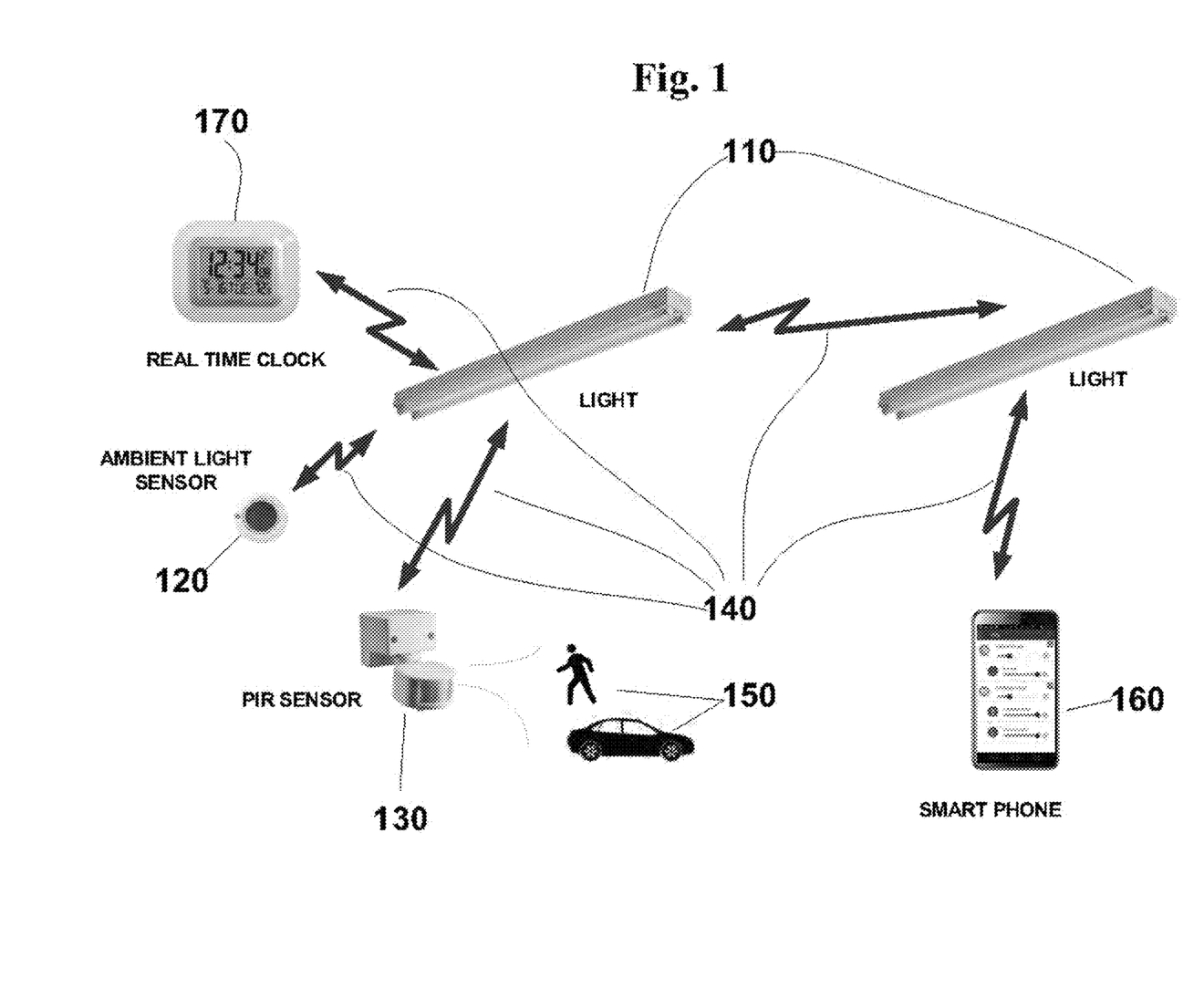
FIG. 1 depicts an example of a lighting system consisting of lights and various types of control devices and sensors.

FIG. 1 shows the system diagram of the present disclosure, with intelligent lights 110, ambient light sensor 120, PIR occupancy sensor 130, smart phone 160, real time clock 170 all connecting via BLE wireless connection 140. PIR sensor 140 may be used to detect motion of human or vehicle 150. The two lights 110 form a simple 2-member mesh network to relay messages so that all devices connected via the BLE network can communicate with each other even though there might not be a direct BLE connection between them. The real-time clock 170 and smart phone 160 are examples of control devices that generate control events, which may results in actions taken by the lights. Events may also be generated by the ambient light sensor 120 and PIR sensor 130, due to, for example, periodic status reporting of light intensity level by the ambient light sensor 120, or changes in status such as motion detection by the PIR sensor 130. All events are propagated throughout the BLE network. Devices on the network may be configured to receive or ignore them as their own control logic is set to do.

It is also a second objective of this disclosure to provide a lighting system whereby the lights can form a wireless mesh network, such that any devices connecting to any lights wirelessly will be able to communicate with any light within the network, being within the radio range of at least one other light within the network.

Figure 2:
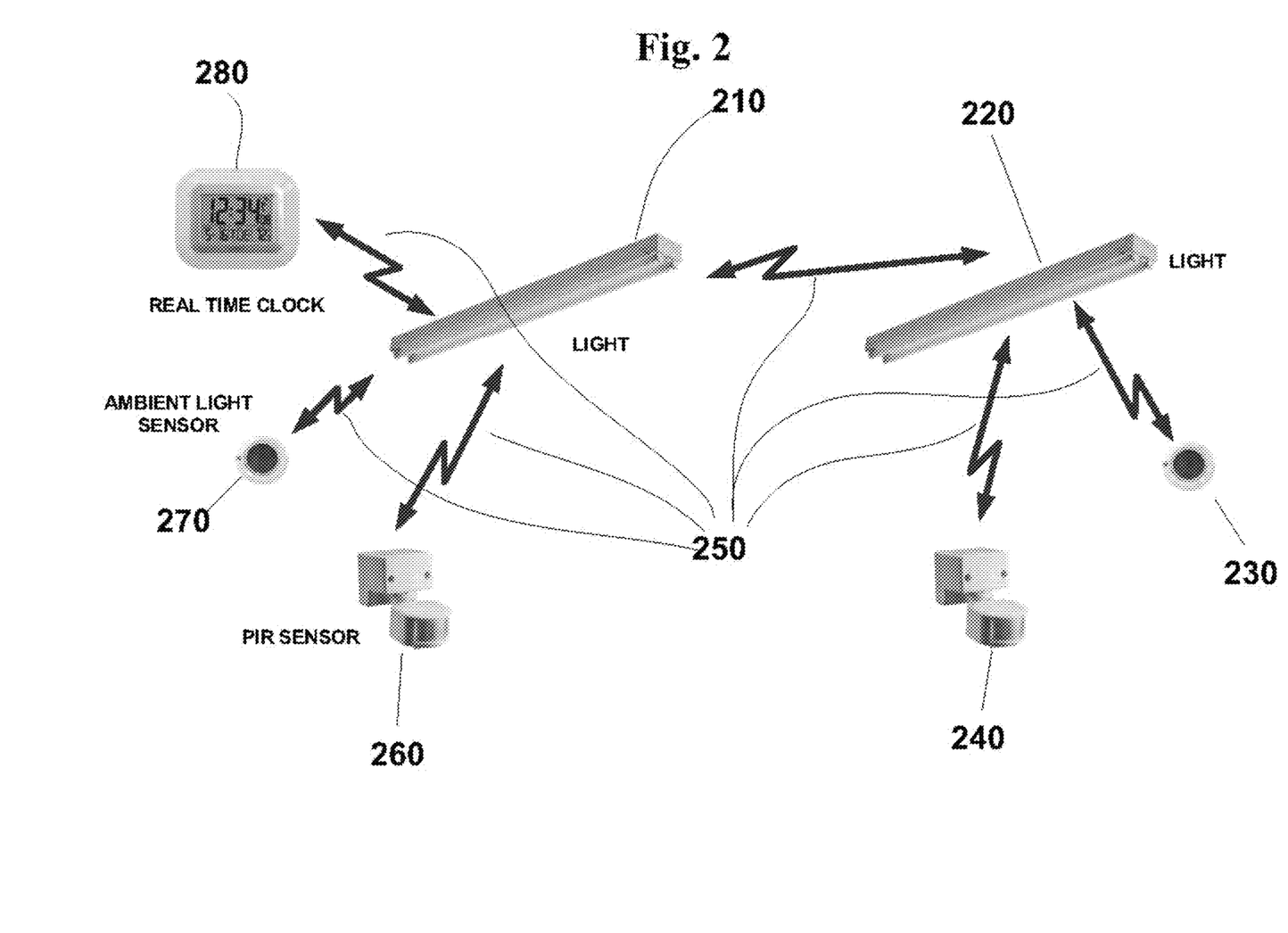
FIG. 2 shows a lighting system with multiple lights and multiple sensors.

FIG. 2 shows a plurality of ambient light sensors 230 and 270, PIR sensors 240 and 260, real-time clock 280, lights 210 and 220, all connected via BLE network 250. Each device can communicate with all other devices via the BLE mesh network. For example, a message being sent by the ambient light sensor 270 to light 220 will be first received by light 210, and then retransmitted to light 220, even though light 220 may not be within radio range of ambient light sensor 270.

With communication between all devices possible, and each device having intelligent processing function, lights 210 and 220 can be configured very flexibly to respond to any other devices generating events within the network in order to meet application requirements. As a first example, lights 210 and 220 may be both configured identically, if they are illuminating the same area, so that they respond identically to sensors 230, 240, 260, 270 which may be placed in the proximity of both lights. In this way any number of lights, in a single work area for example, can be grouped together easily. Conversely if they are not in the same area, and light 210 is in the proximity of sensors 230 and 240, while light 220 is in the proximity of sensors 260 and 270, light 210 can be configured to respond to events generated by sensors 230 and 240, while light 220 responds to sensors 260 and 270.

Lighting System Configuration

The objectives of this disclosure are achieved by providing a unique address as well as a processing unit to store and execute the decision logic in each of the lights, control devices and sensors, and a wireless mesh networking protocol that allows each entity to communicate with any other entities within the same network.

Figure 3:
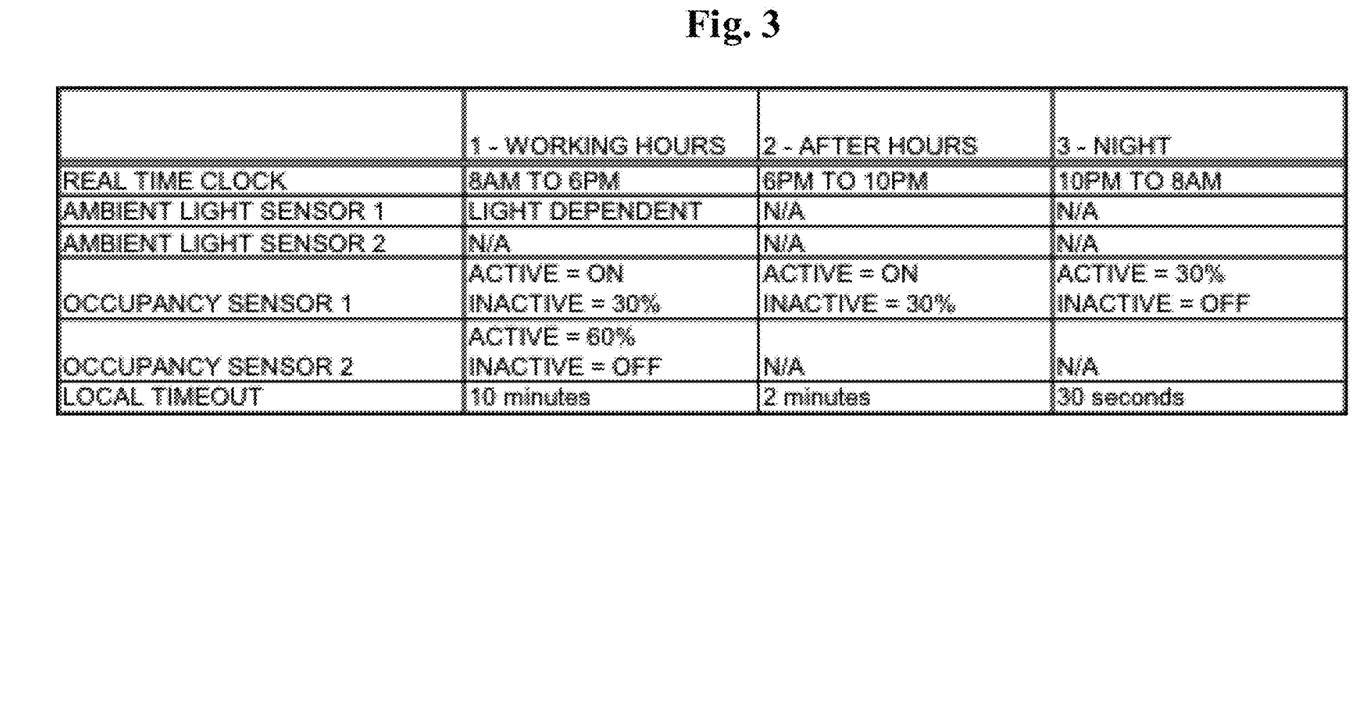
FIG. 3 depicts an example of a configuration data table that would be used in a light to act upon events generated by other devices.

FIG. 2 also shows a real-time clock 280, being a control device that generates events of real time information that the lights can use to trigger time-based actions. FIG. 3 shows an example of a configuration table that would be stored in a light and used as the decision logic for any events received from other devices. The devices generating events are in the first column, being the real-time clock, ambient light sensors 1 and 2, occupancy sensors 1 and 2, and local timeout which is a built-in timer of the light itself. The second, third and fourth columns denote three sets of conditions for different actions, in this example being for different time periods of the day: 8 AM to 6 PM, 6 PM to 10 PM, and 10 PM to 8 AM. These are events generated by the real-time clock. N/A denotes no actions or events being ignored. Thus the light does not respond to any events from ambient light sensor 2. A simple override logic applies in this example that the light adopts the action of the highest output as required by any one cell. The concept is equally applicable in the case with more complex logic functions between the cells, as would be defined externally to this table. In this example therefore, during working hours of 8 AM to 6 PM, the light would adjust intensity based on the ambient light sensor 1 if no other sensors are active. If occupancy sensor 1 is active, the light would be fully on (100%). When it is inactive or no occupancy is detected, the intensity would be adjusted to 30%. If occupancy sensor 2 is active the light intensity would be 60%, and would be turned off if it is inactive. Finally the local timeout would delay any actions by the duration of 10 minutes in this case, thus for example after occupancy sensor 1 goes from active to inactive, the light would only be dimmed down to 30% after 10 minutes. This example would be typical of an office location where the light would be in the proximity of ambient light sensor 1 and occupancy sensor 1, while occupancy sensor 2 could be a little further away, while ambient light sensor 2 is not in the vicinity at all. The other two columns define the conditions that the light would be only triggered by occupancy sensor 1, with even lower intensities and shorter timeouts, as would be appropriate for after-work and late night hours. This simple example shows the flexibility of the light being controlled by multiple sensors and a real-time clock, and achieve the purpose of energy saving while responding to sensors appropriately, all defined by a simple configuration data table.

Figure 4:
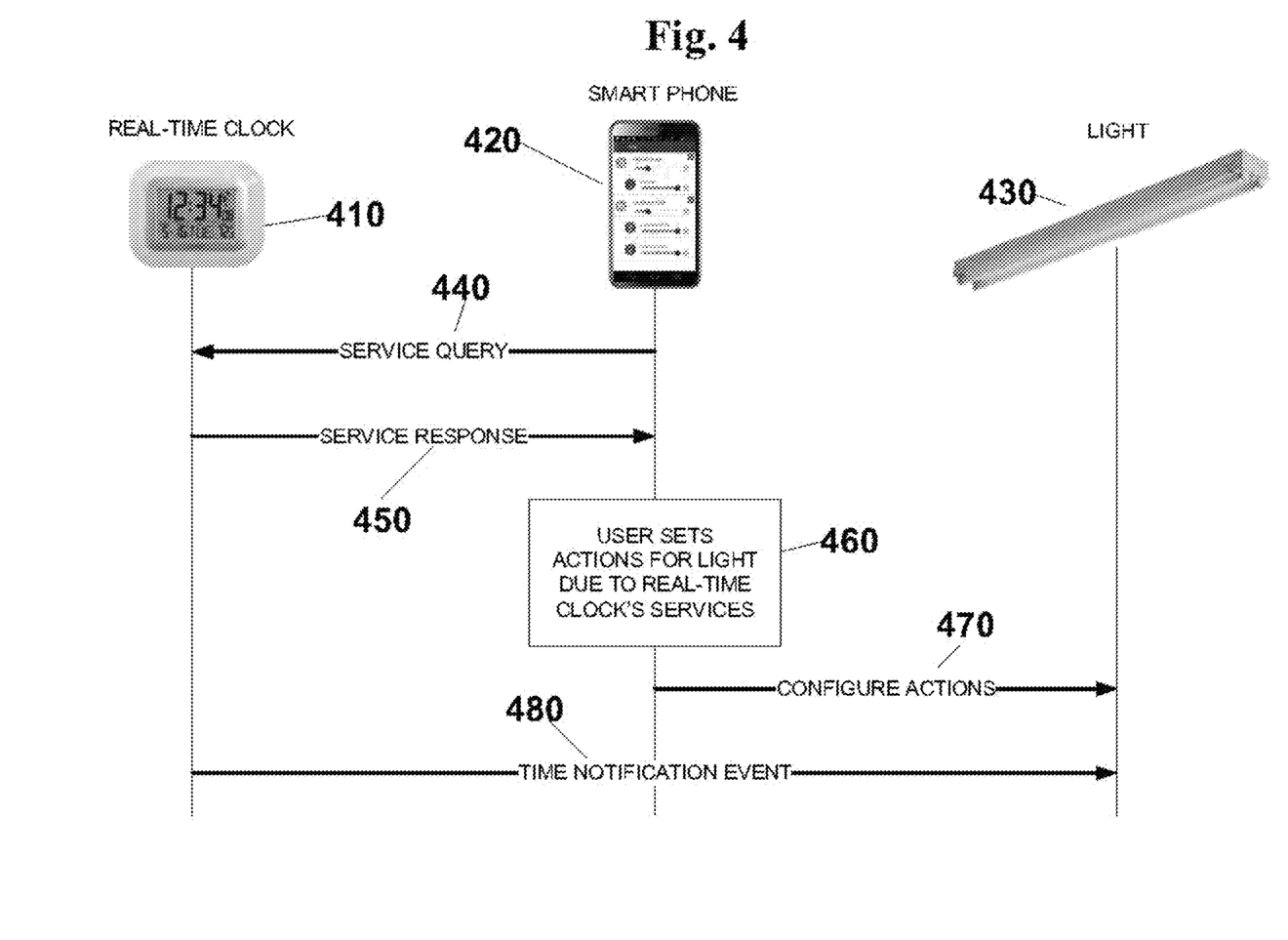
FIG. 4 shows a message sequence chart for the configuration of services from a real-time clock to be used by a light, using a smart phone as the configuration device.

Before the configuration data such as the table shown in FIG. 3 can be set, the control devices and sensors available in a network needs to be discovered. As an important innovation in this disclosure, the process of discovery and configuration is performed by a device such as a smart phone, which does not need to be present after configuration is set up. An example of this operation is shown in a simplified message sequence chart in FIG. 4. In this case smart phone 420 initiates a service discovery process by sending a query message 440 to a real-time clock 410, which then responds by the service response message 450 giving the smart phone 420 all its service capabilities information. For example, the service capabilities from a real-time clock may be time notification messages sent out once every minute. The user may then be able to set actions for the light to turn on and off at specific time instances, as denoted by process 460. The smart phone 420 will then send the configuration data to the light 430 using a configure action message 470, which needs only to contain the address of the real-time clock as the source address to receive events from, and the on and off times in a table similar to FIG. 3. Once the configuration is set up, the smart phone 420 no longer needs to be involved as time notification event 480 would be directly sent by the real-time clock 410 to the light 430.

Network Connectivity and Location Based Services

It is another objective of this disclosure to provide location-based services by having each light being able to transmit and receive beacon packets, such as BLE advertising packets, so that devices receiving beacons from a light may initiate actions based on proximity to such light as implied by successful reception of such beacons. In the event of multiple beacons from multiple lights being received, that the beacon with then the highest received signal strength indicator (RSSI) will be considered the closest proximity. Conversely the device may transmit beacons to be received by the lights, which would relay such data packets together with RSSI to a destination that would make use of the information and be able to determine the closest light to the device by the highest RSSI.

Figure 5:
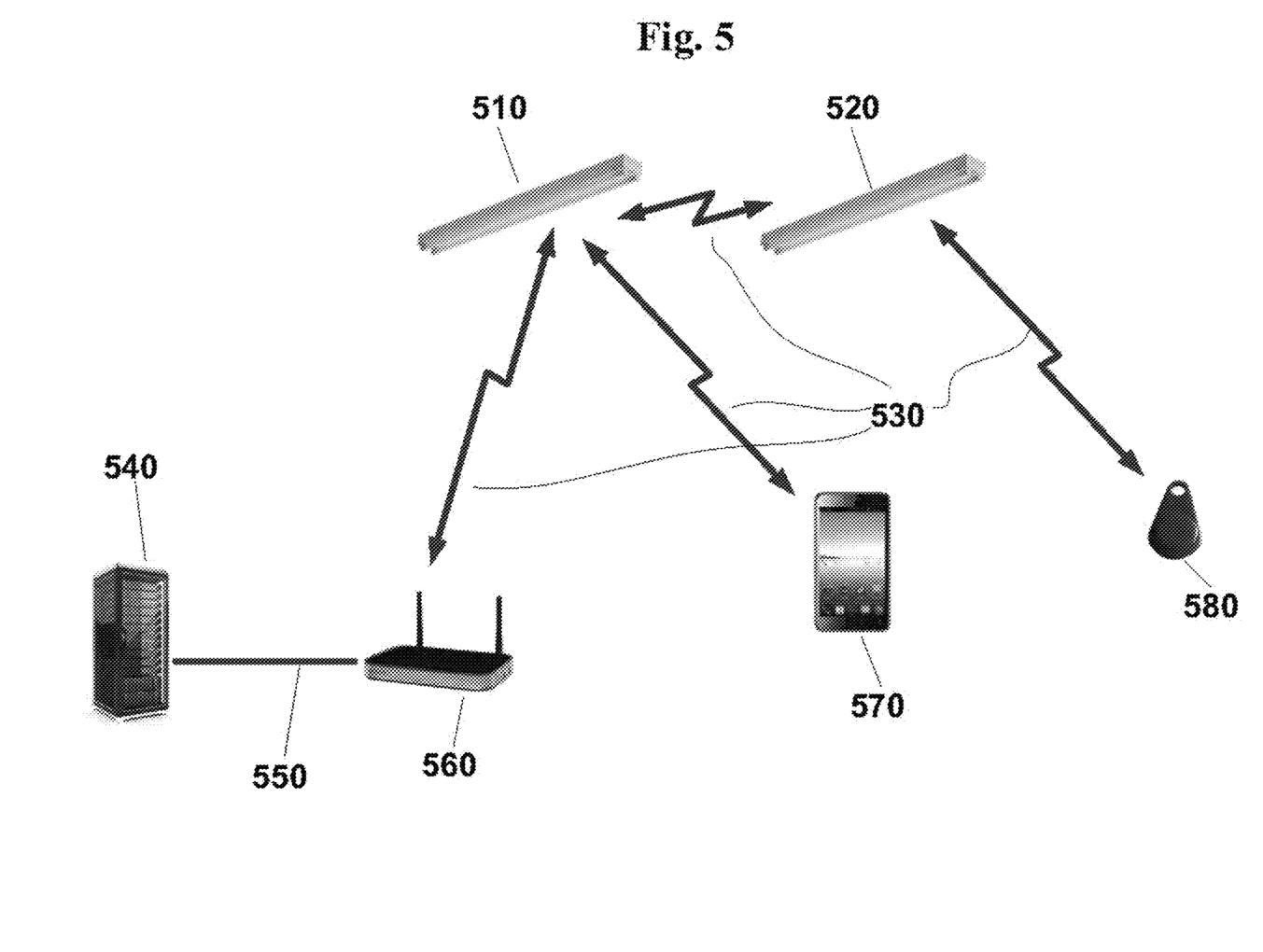
FIG. 5 depicts a lighting system with lights interacting with devices connecting to a central computer over the internet to support location-based applications.

Location-based services may be implemented utilizing broadcast messages transmitted from lights to other devices, and from other devices to the lights, together with RSSI measured at the receiving side. In the case of the wireless network being BLE, the advertising packets can be used as broadcast messages. FIG. 5 shows an example of the system for such applications, with lights 510 and 520 being connected via BLE to a gateway 560 connecting over internet 550 to a central computer 540. There are also a smart phone 570 and a tag 580 within BLE radio range of the lights 510 and 520. As an example of location-based service to the smart phone 570, BLE advertising packets are transmitted periodically from lights 510 and 520, and received by smart phone 570. Based on RSSI of the packets received, smart phone 570 may determine that it is closest to light 510 and thus would trigger other actions as determined by the location-based services. As another embodiment, the broadcast information packet may be configured remotely from the central computer 540, over the internet 550 and through the gateway 560 to lights 510 and 520.

In another embodiment of location-based services for tracking of devices, tag 580 transmits periodically advertising packets which are received by lights 510 and 520. Both lights report the received packets, together with the RSSI of each packet, via gateway 560 out to internet to central computer 540, which can determine based on the highest RSSI, the light to which the tag is closest. Thus the location of the tag can be tracked by a network of intelligent lights described herein.

Mesh Zones Using RSSI

In another embodiment location-based services may be used for the tracking of devices in a retail setting. As depicted from above in FIG. 9A, lighting units 910 may be used to track items located on Aisles 1-5 in retail store 900. Of course the system could just as well work in other storage settings as well (e.g. a warehouse). In this embodiment multiple mesh zones 915*a-c* can be formed by having the lighting unit 910 selectively connect to devices that meet an RSSI threshold. It is well known that, due to the concentration of electromagnetic radiation, the RSSI a receiving node observes decreases as the distance between the transmitting node and the receiving node increases. This phenomenon may be used to approximate a distance between a transmitting node and a receiving node.

Figure 9A:
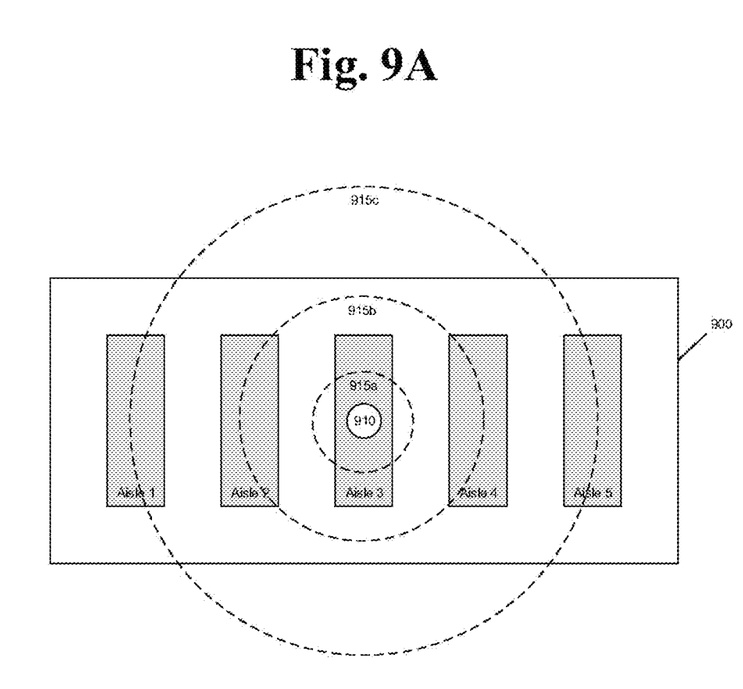
FIG. 9A depicts the creation of mesh zones based on RSSI thresholds observed at receiving nodes from one lighting unit.

In FIG. 9A each concentric circle 915*a-c* represents a mesh zone in which all of the devices within the boundary would at least meet a theoretical RSSI threshold. For example, since Aisle 3 is closest to lighting unit 910 the RSSI strength observed by devices on Aisle 3 will be higher than the RSSI observed by devices at Aisle 2 and 4. Thus if a connection is to be formed between the lighting unit 910 and devices on Aisle 3 a mesh zone may be formed by only connecting to devices that meet an RSSI threshold that correlates to a zone defined by perimeter 915*a*. Similarly if a network is to be made with all the devices on Aisles 1-5 the RSSI threshold maybe changed to correspond to perimeter 915*c*. Additionally many combinations of RSSIs maybe used to selectively design any number of zones (e.g. a zone can be made that encompass only devices on Aisle 2 and Aisle 4 by connecting to devices meet an RSSI threshold higher than 915*a*, but less than 915*c*, and are closes to 915*b*.

Figure 9B:
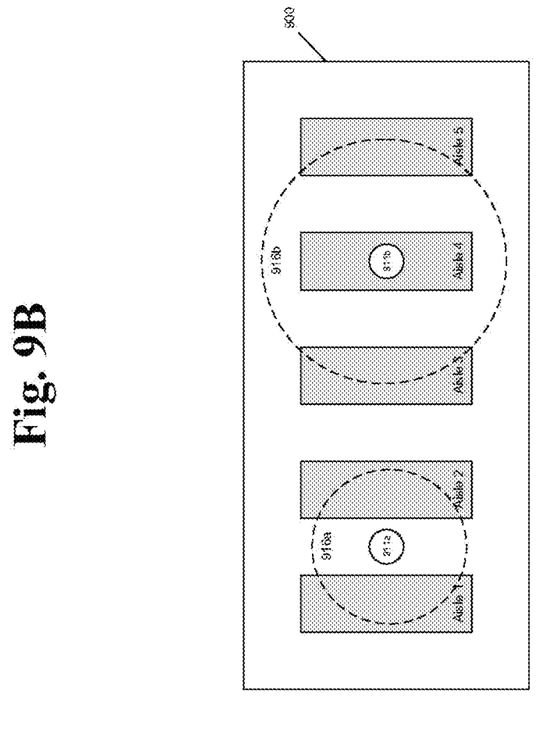
FIG. 9B depicts the creation of mesh zones based on RSSI thresholds observed at receiving nodes from multiple lighting units.

In another embodiment, as in FIG. 9B, two separate lighting units 911*a-b* may form two independent mesh zones 916*a-b* respectively. Thus by adjusting the RSSI threshold that can connect to lighting units 911*a-b*, each lighting unit can be associated with any number of devices residing on a Aisles 1-5. In the example of FIG. 9B the RSSI thresholds are set so that lighting unit 911*a* connects to devices on Aisles 1 and 2 and lighting unit 911*b* connects to devices on Aisles 3, 4, and 5.

System Implementation and Deployment

With these aforementioned inventions, it is possible to deploy an intelligent lighting system easily scalable to any size buildings, with minimal installation costs by not requiring any special wiring, and with the greatest flexibility in terms of allowing each individual light to be controlled by any combinations of events generated by sensors and control devices. Further by using BLE as the wireless communication protocol, configuration using smart phone apps directly is made possible.

Furthermore, the use of a feature-rich third device such as a smart phone, to configure the actions taken by a first device which is the light, responding to events generated by a second device which is the sensor, is significant in reducing the complexity of the devices. In this case, service discovery is performed by the smart phone and not by the devices themselves, as is commonly required in many protocols such as UPnP. It also allows the configuration data for the decision logic functions to be simple, low-level events and actions that requires only simple hardware to execute and small memory to store.

Figure 6:
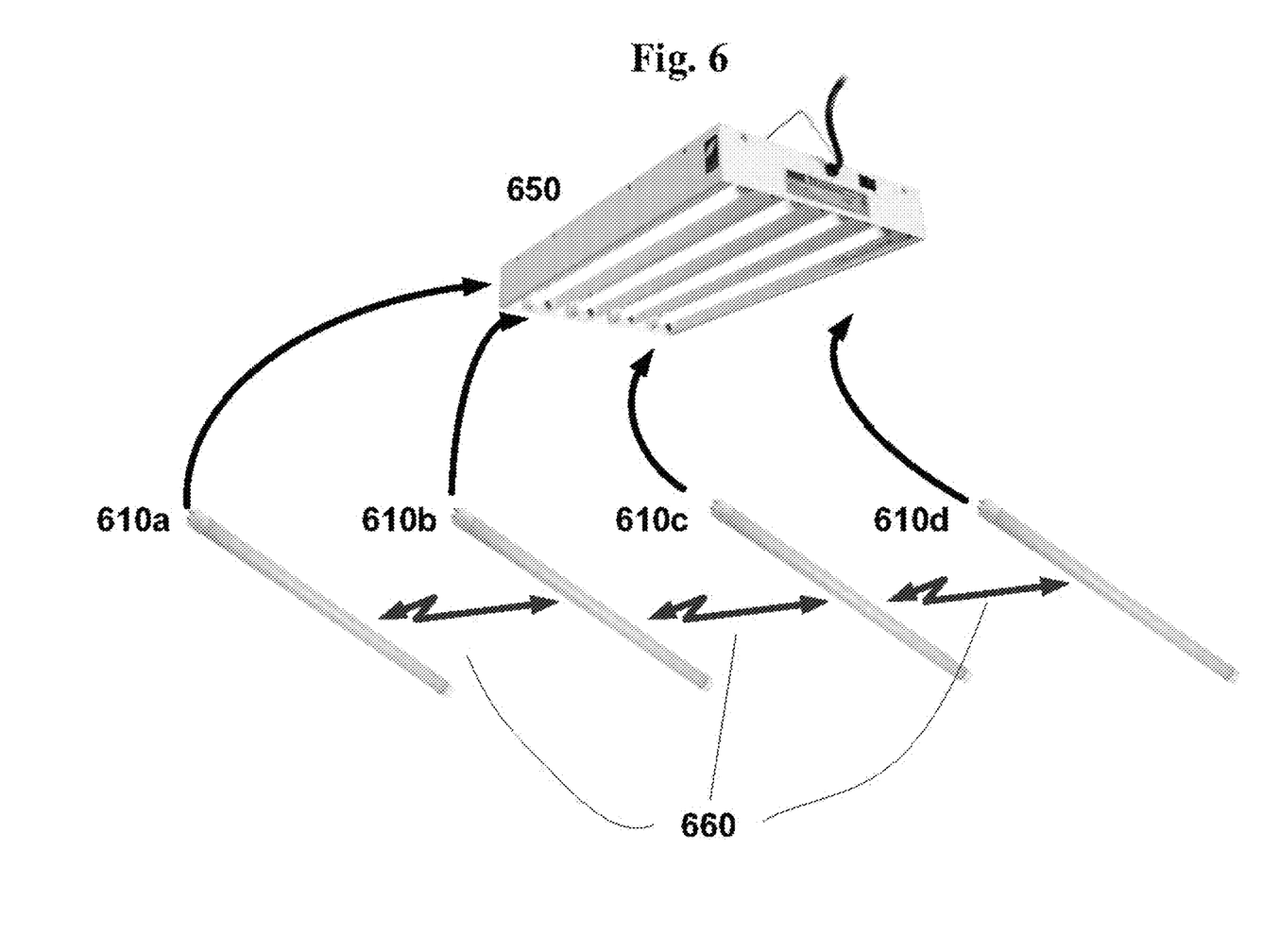
FIG. 6 depicts light tubes each having all capabilities as intelligent light individually while being housed in a single fixture.

Implementation of the intelligent lights may take the form of individual light bulbs or tubes, such as sizes A-15, A-19, B-8, MR-8, T5, T8 and so on. An example of implementation in the form of T8 light tubes is shown in FIG. 6, where each of the light tube 610, 620, 630 and 640 are equipped with wireless communication, processing and storage capabilities, that they are able to function as individually addressable intelligent light, and form a wireless network 660, while fitting together into a fixture 650.

Figure 7:
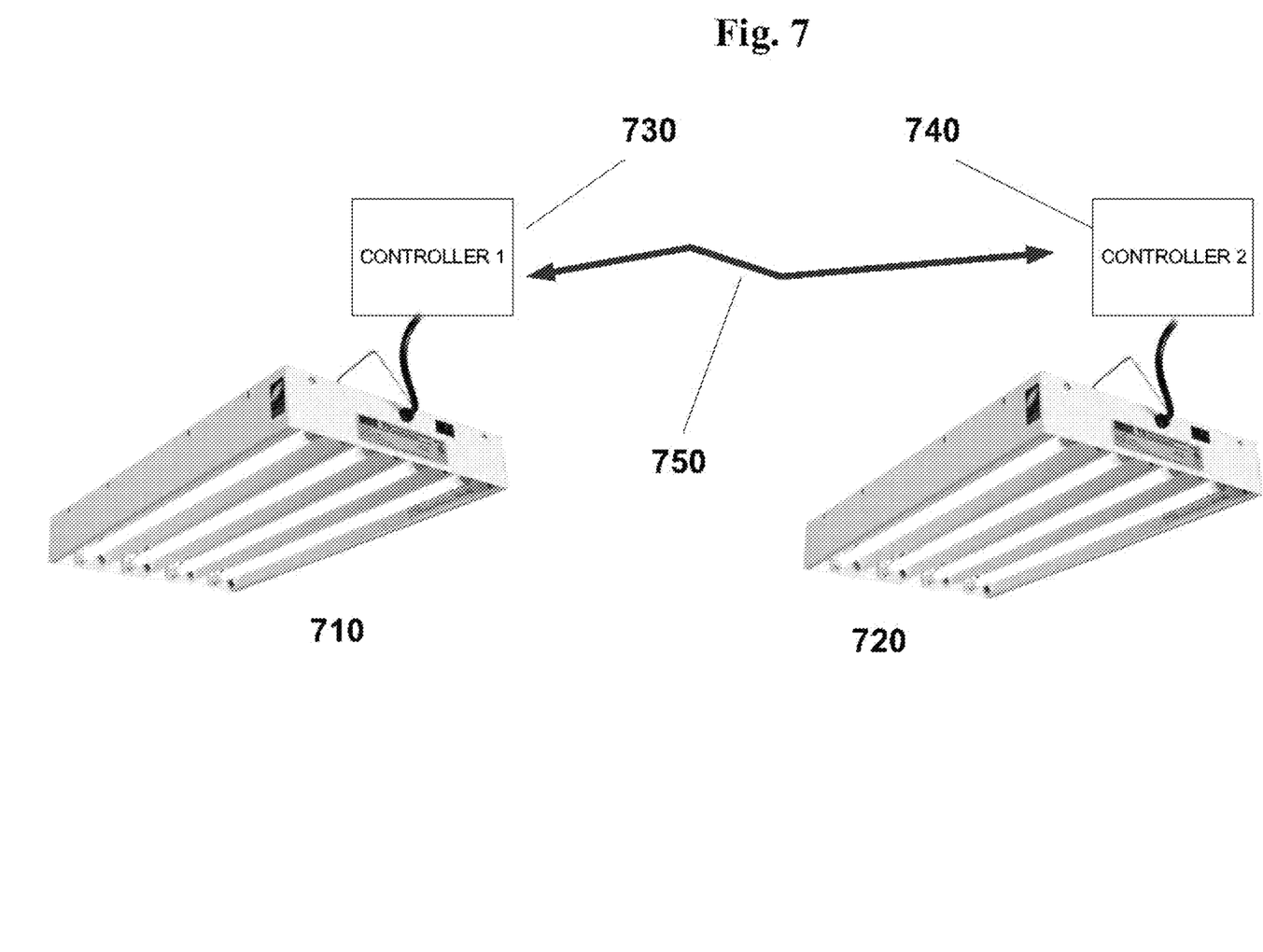
FIG. 7 depicts a light fixture containing multiple light tubes, with each fixture being enabled by a controller that is capable of multiple functionalities.

As a different implementation, a light fixture containing multiple bulbs or tubes may be enabled by a separate controller to be an intelligent light, as shown in FIG. 7, where light fixtures 710 and 720 are controlled by controllers 730 and 740, which contain processing and storage functions, and can communicate wirelessly over connection 750.

Figure 8:
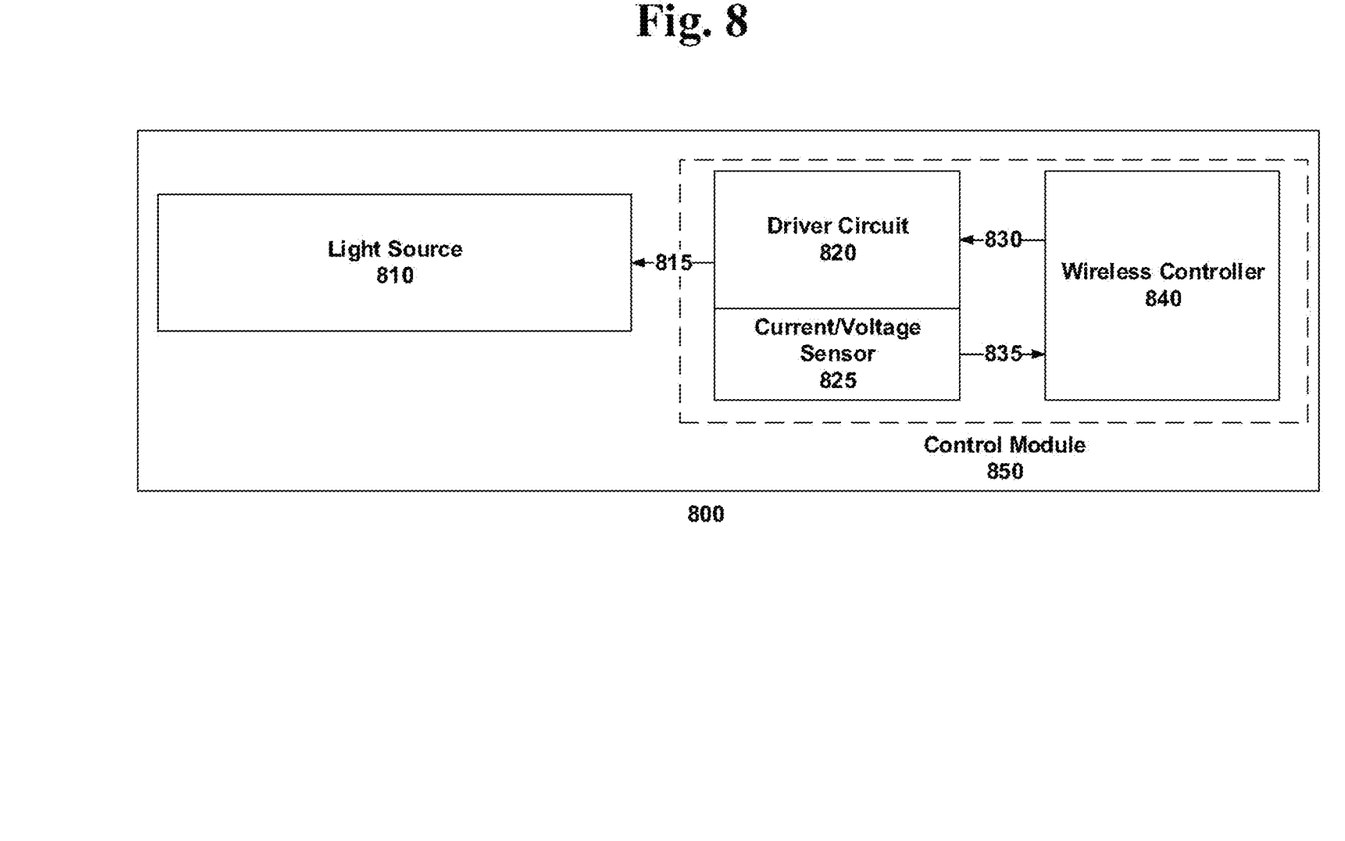
FIG. 8 depicts a block diagram illustrating the various components embedded within a light tube.

In one implementation of the present invention each light tube may be equipped with circuitry that allows it complement the overall lighting system. FIG. 8 depicts a block diagram illustrating the various components embedded within a light tube 800. Inside the light tube 800, in one embodiment, exists light source 810 and a control module 850. Control module 850 powers the light source 810 via electrical connection 815. Control module 850 comprises of a driver circuit 820, a current/voltage sensor 825, and a wireless controller 840. The wireless controller 840 may enable wireless communication and also may further comprise of a processor for controlling and regulating the operation the light tube 800. Upon determining whether to turn on the light wireless controller 840 may send control signal 830 to the driver circuit 820. When the light is in operation current/voltage sensor 825 may send power level signal 835 to the wireless controller 840 in order to be able to accurately record and determine energy consumption. Wireless controller may then send this unique record over the wireless network to a control device for a user to then review.

What is claimed is:

1. A method of creating a mesh network zone, the method comprising:
    at a transmitting node broadcasting an advertisement signal;
    at a receiving node receiving the advertisement signal from the transmitting node, and then calculating and advertising a received signal strength indicator (RSSI) of the advertisement signal;
    comparing the advertised RSSI against a predetermined threshold; and
    creating a mesh network between the transmitting node and the receiving node if the advertised RSSI satisfies the predetermined threshold.

2. The method of claim 1 wherein the advertised RSSI exceeds the predetermined threshold if the advertised RSSI is higher than a predetermined RSSI value.

3. The method of claim 1 wherein the advertised RSSI satisfies the predetermined threshold if the advertised RSSI is lower than a predetermined RSSI value.

4. The method of claim 1 wherein the advertised RSSI satisfies the predetermined threshold if the advertised RSSI is lower than a first predetermined RSSI value and higher than a second predetermined RSSI value.

5. The method of claim 1, further comprising:
    configuring each of the transmitting node and receiving node with decision logic correlating a real-time clock with a sensor events.

* * * * *